(No Model.)
C. A. ROLFE.
INK ROLLER FOR TELEGRAPH REGISTERS.
No. 544,645. Patented Aug. 13, 1895.
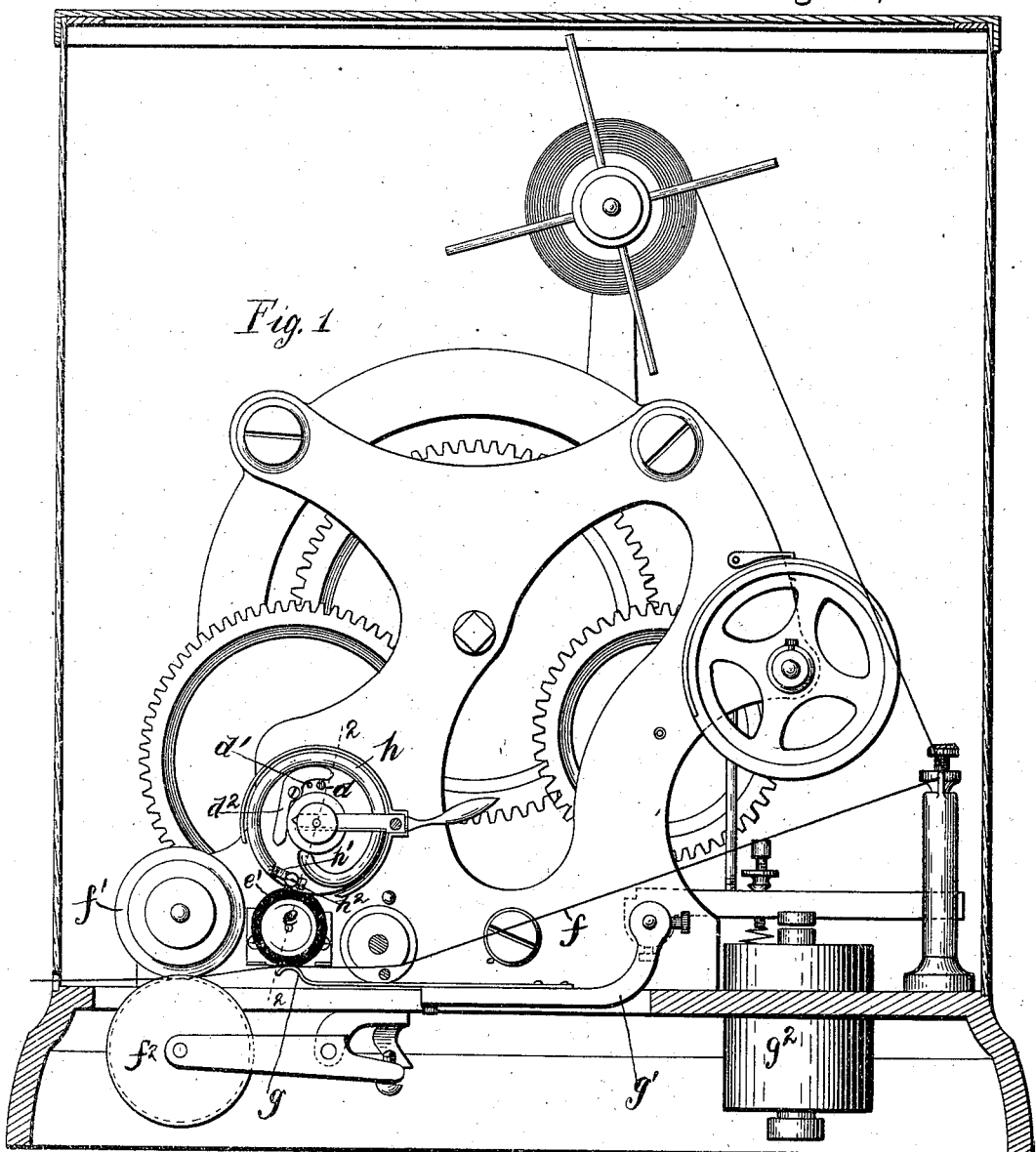
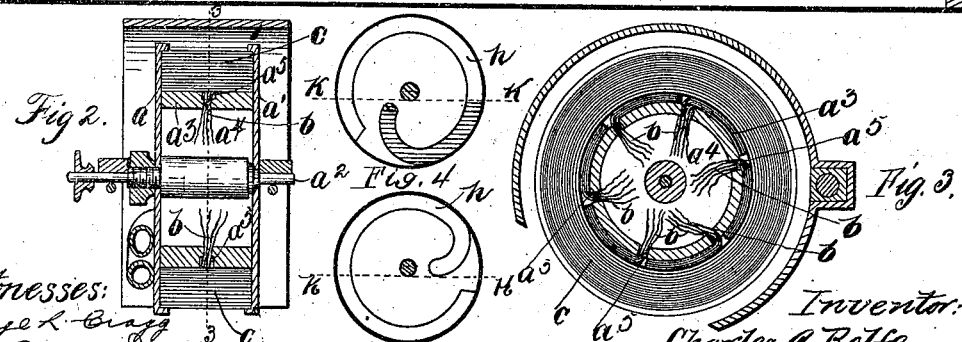
Witnesses:
George L. Bragg
W. Clyde Jones
Inventor:
Charles A. Rolfe
By Barton & Brown
Attorneys

UNITED STATES PATENT OFFICE.

CHARLES A. ROLFE, OF CHICAGO, ILLINOIS.

INK-ROLLER FOR TELEGRAPH-REGISTERS.

SPECIFICATION forming part of Letters Patent No. 544,645, dated August 13, 1895.

Application filed April 18, 1895. Serial No. 546,268. (No model.)

*To all whom it may concern:*

Be it known that I, CHARLES A. ROLFE, a citizen of the United States, residing at Chicago, in the county of Cook and State of Illinois, have invented a certain new and useful Improvement in Ink-Rollers for Telegraph-Registers, (Case No. 2,) of which the following is a full, clear, concise, and exact description, reference being had to the accompanying drawings, forming a part of this specification.

My invention relates to an ink-roller for telegraph-registers, and its object is to provide means whereby the ink is continuously and uniformly fed from a central ink-receptacle to a surrounding layer of absorbent material, against which the stylus-wheel is adapted to bear, the construction being such that excessive flow of the ink, and the consequent blotting of the tape, is prevented.

A further object is to improve the construction of the stylus-wheel.

Heretofore it has been proposed to provide the ink-roller with a central ink-receptacle, which is surrounded by a layer of absorbent material, the absorbent material being in communication with the ink-receptacle, whereby it may become saturated with ink, the stylus-wheel being adapted to engage with the surface of the absorbent material to receive ink therefrom. Considerable difficulty has been experienced with this construction, due to the fact that when the roller is at rest the portion of the absorbent material that is for the time being beneath the ink-receptacle becomes so saturated with ink that the ink flows down the surface of the stylus-wheel to the tape, thus blotting the same and covering some of the working parts of the register with ink.

In accordance with my invention the ink-receptacle is entirely disconnected from the layer of absorbent material, except through a number of wicks which pass through holes provided in the periphery of the ink-receptacle, the wicks completely filling the holes, so that the only escape for the ink within the receptacle is through the capillary attraction of the wicks, the ink being thus drawn through the wicks and into contact with the absorbent material, which becomes saturated and imparts ink to the stylus-wheel, making contact therewith. As the only escape for the ink is through the capillary attraction of the wicks, all portions alike of the absorbent material absorb the ink and the resting of the roller in any particular position does not produce an overflow of the ink.

A further feature of my invention is the provision of the stylus-wheel, having a periphery of rubber adapted to bear against the ink-roller and against which the tape is adapted to be moved. The roller, as thus constructed, produces a more satisfactory operation than the metallic roller heretofore employed.

A further feature of my invention is a vent adapted to admit air to the interior of the ink-receptacle without permitting the escape of the ink.

My invention will be more readily understood by reference to the accompanying drawings, in which—

Figure 1 is a view in elevation of a telegraph-register embodying my invention. Fig. 2 is a sectional view of the ink-roller on line 2 2, Fig. 1. Fig. 3 is a sectional view on line 3 3, Fig. 2. Figs. 4 and 5 are views illustrating the position of the liquid in the vent as the roller is rotated.

Like letters refer to like parts in the several figures.

The ink-roller comprises disks $a\ a'$, mounted upon a shaft $a^2$ and supporting between them a hollow cylindrical portion $a^3$, thus forming an ink-receptacle $a^4$. The cylinder $a^3$ is provided in its periphery with a series of holes $a^5$, arranged at points around the circumference. Wicks $b$ extend through the holes $a^5$, completely filling the same, the inner ends of the wicks being extended for a distance into the interior of the ink-receptacle. Over the outer ends of the wicks is wound a number of layers of silk tape, thus forming a layer $c$ of absorbent material of considerable thickness.

I preferably make the wicks of cotton and the absorbent material of silk; but other materials may be employed, as may be found most desirable.

In the side of the ink-receptacle is provided an opening $d$, by means of which ink may be introduced into the receptacle, an opening $d'$ being provided for the escape of the air while the ink is being introduced. A pivoted plate $d^2$ is adapted to seal the openings $d$ and $d'$ in one position and to open the same when in its alternate position. Against the surface of the absorbent material $c$ the stylus-wheel $e$ is adapted to bear, the said wheel being provided with a tire $e'$, of rubber. The tape $f$ is fed forward by rollers $f'$ $f^2$ and passes over a presser-foot or pen $g$, adapted when elevated to bring the tape into contact with the surface of the stylus-wheel, whereby an ink-mark is imprinted upon the surface of the tape. The presser-foot $g$ is mounted upon the end of a pivoted lever $g'$, adapted to be rotated by the electromagnet $g^2$ in the usual manner, the actuation of the electromagnet also serving to effect the rotation of the feeding-rollers $f'$ $f^2$ in the usual manner. By making the periphery of the stylus-wheel $e$ of rubber I am enabled to obtain better results than can be obtained by the employment of a stylus-wheel having a metallic periphery, as the ink is more readily retained thereon and a clearer imprint is made upon the tape. Furthermore, the rubber acts as a cushion to break the force of the blow from the presser-foot, thus preventing the noise due to the striking of the presser-foot upon the stylus-wheel and preventing a jar upon the operating parts.

While not always necessary, it is sometimes desirable to admit air to the ink-receptacle, in order that the ink may flow more freely, and to admit the air without permitting the escape of the ink I provide upon the side of the roller a spiral-like tube $h$, which communicates with the ink-receptacle at the inner end, while the outer end is open to the air. As shown in Fig. 4, if the level of the ink within the ink-receptacle is at line $k$ $k$ the inner portion of the tube will be filled with ink, as indicated. The roller is rotating in the direction indicated by the arrow and the ink flows through the inner end of the tube into the ink-receptacle until the roller reaches the position illustrated in Fig. 5, when the tube $h$ is completely emptied, remaining empty until the roller again reaches the position illustrated in Fig. 4. The ink thus flows into the inner end of the tube $h$ and then back into the ink-receptacle, the ink within the receptacle being thus exposed to the atmospheric pressure without the escape of the ink. Opposite the end of the tube $h$ is provided a screw $h'$, mounted in a standard $h^2$, the screw being adapted to be moved against the end of the tube $h$ to seal the same. The end of the screw $h$ is made conical, so that the vent may be opened to a greater or less extent by means of the screw.

Having described my invention, what I claim as new, and desire to secure by Letters Patent, is—

1. An ink roller mounted to rotate in a vertical plane, and carrying an interior ink receptacle, a layer of absorbent material provided at the periphery of the roller, and a wick or wicks extending into said receptacle and in contact with said layer of absorbent material, whereby the oversaturation of the absorbent material at the lowermost portion of the roller is prevented; substantially as described.

2. In an ink roller, the combination with an ink receptacle, of a spiral like tube $h$ communicating with the receptacle at the inner end, said roller being adapted to be rotated in a direction to empty the liquid from the inner end of said tube into the ink receptacle; substantially as described.

In witness whereof I hereunto subscribe my name this 4th day of April, A. D. 1895.

CHARLES A. ROLFE.

Witnesses:
W. CLYDE JONES,
JOHN W. SINCLAIR.